United States Patent
Kontkanen (10) Patent No.: US 9,329,750 B2
(45) Date of Patent: May 3, 2016

(54) THREE-DIMENSIONAL TILT AND PAN NAVIGATION USING A SINGLE GESTURE

(71) Applicant: Google Inc., Mountain View, CA (US)

(72) Inventor: Janne Kontkanen, San Francisco, CA (US)

(73) Assignee: Google Inc., Mountian View, CA (US)

(*) Notice: Subject to any disclaimer, the term of this patent is extended or adjusted under 35 U.S.C. 154(b) by 275 days.

(21) Appl. No.: 14/022,262

(22) Filed: Sep. 10, 2013

(65) Prior Publication Data

US 2015/0074611 A1 Mar. 12, 2015

(51) Int. Cl.
*G06F 3/0481* (2013.01)

(52) U.S. Cl.
CPC .................. *G06F 3/04815* (2013.01)

(58) Field of Classification Search
CPC ........ G06F 3/017; G06F 3/0481; H04N 5/268
USPC ................. 715/848, 863; 345/419; 348/222.1
See application file for complete search history.

(56) References Cited

U.S. PATENT DOCUMENTS

| | | | | |
|---|---|---|---|---|
| 5,900,925 | A * | 5/1999 | Navarro ........................... | 352/53 |
| 6,433,781 | B1 * | 8/2002 | Oda et al. ........................ | 345/167 |
| 7,707,516 | B2 * | 4/2010 | O'Mullan et al. ............. | 715/834 |
| 7,752,555 | B2 * | 7/2010 | Sutanto et al. .................. | 715/760 |
| 8,312,392 | B2 | 11/2012 | Forutanpour et al. | |
| 8,314,789 | B2 | 11/2012 | Fitzmaurice et al. | |
| 8,345,014 | B2 | 1/2013 | Lim | |
| 8,384,675 | B2 | 2/2013 | Westerman et al. | |
| 8,754,854 | B1 * | 6/2014 | Hamburgen et al. ......... | 345/168 |
| 2005/0036036 | A1 * | 2/2005 | Stevenson et al. ........ | 348/211.99 |
| 2008/0184173 | A1 * | 7/2008 | Sutanto ................. | G06F 3/0481 715/863 |
| 2010/0045666 | A1 | 2/2010 | Kornmann et al. | |
| 2010/0045667 | A1 * | 2/2010 | Kornmann et al. ........... | 345/419 |
| 2010/0045703 | A1 | 2/2010 | Kornmann et al. | |
| 2010/0045817 | A1 * | 2/2010 | Saijo .......................... | 348/222.1 |
| 2010/0053219 | A1 | 3/2010 | Kornmann | |
| 2011/0016433 | A1 * | 1/2011 | Shipley ......................... | 715/849 |
| 2012/0068950 | A1 * | 3/2012 | Conde et al. .................. | 345/173 |
| 2012/0081875 | A1 * | 4/2012 | Yamaguchi et al. .......... | 361/807 |
| 2012/0270653 | A1 | 10/2012 | Kareemi et al. | |
| 2012/0326965 | A1 | 12/2012 | Leung | |
| 2013/0002802 | A1 * | 1/2013 | Mock .......................... | 348/14.03 |
| 2014/0009415 | A1 * | 1/2014 | Nishida ........................ | 345/173 |
| 2014/0019917 | A1 * | 1/2014 | Piemonte et al. ............. | 715/848 |
| 2014/0053113 | A1 * | 2/2014 | Zoon et al. ..................... | 715/863 |
| 2014/0229871 | A1 * | 8/2014 | Tai et al. ....................... | 715/765 |

FOREIGN PATENT DOCUMENTS

EP 0 884 909 7/2006

* cited by examiner

*Primary Examiner* — Jennifer To
*Assistant Examiner* — Jasmine Wan
(74) *Attorney, Agent, or Firm* — Dority & Manning, P.A.

(57) ABSTRACT

Systems and methods for providing tilt and pan navigation within a three-dimensional environment in response to a single gesture are provided. An exemplary computer-implemented method includes receiving, by one or more computing devices, data describing a drag performed by a user. The computer-implemented method includes, in response to the drag, incrementally adjusting, by the one or more computing devices, a tilt angle of a virtual camera until the tilt angle equals one of a maximum tilt angle or a minimum tilt angle, and panning, by the one or more computing devices, the virtual camera with respect to a rendering of a three-dimensional model. An exemplary system includes a client device and a server in operative communication over a network.

15 Claims, 7 Drawing Sheets

THREE-DIMENSIONAL TILT AND PAN NAVIGATION USING A SINGLE GESTURE

FIELD

The present disclosure relates generally to navigating a viewpoint within a three-dimensional environment. In particular, the present disclosure relates to systems and methods for providing tilt and pan navigation within a three-dimensional environment in response to a single gesture.

BACKGROUND

Certain computer applications can provide an interactive three-dimensional environment. For example, three-dimensional modeling software can be used to generate and modify three-dimensional models of real world objects.

Other applications that provide an interactive three-dimensional environment include a virtual globe application, a mapping application, or other components of a geographic information system. In particular, such applications can provide an interactive rendering of a three-dimensional model of all or a portion of the surface of the Earth. The three-dimensional model can include terrain, structures such as roads and buildings, or other points of interest.

In certain applications, the user can be permitted to navigate about the three-dimensional environment. For example, the user may be permitted adjust the position and orientation of a virtual camera within the three-dimensional environment to control the viewpoint provided to such user.

Further, in certain applications, the user can be permitted to tilt the virtual camera away from a strictly overhead view. In such fashion, three-dimensional components of the rendering of the three-dimensional model, such as terrain or skyscrapers, can contribute to a compelling visualization of the real world.

However, the controls provided to a user for navigating about a three-dimensional environment can be difficult to learn and use. For example, when navigational actions such as tilting, panning, and zooming must each be controlled or prompted by separate gestures or control widgets, the user may struggle to learn and synthesize each of such different controls. Thus, the user can struggle to view a particular region of the rendering or struggle to achieve a particularly desired viewpoint, reducing user satisfaction.

This problem is particularly acute in the mobile computing device context, in which the display area for a user interface is generally limited in size. Thus, providing multiple controls for respective navigational actions can clutter the screen, detracting from the immersive experience of the three-dimensional environment. Further, for users with less dexterous fine motor skills, performing multiple unique control gestures can be an intimidating deterrent to the use and enjoyment of the computer application.

SUMMARY

Aspects and advantages of embodiments of the present disclosure will be set forth in part in the following description, or may be obvious from the description, or may be learned through practice of the embodiments.

One aspect of the present disclosure is directed to a computer-implemented method for controlling a virtual camera in a three-dimensional environment. The computer-implemented method includes receiving, by one or more computing devices, data describing a drag performed by a user. The computer-implemented method includes, in response to the drag, incrementally adjusting, by the one or more computing devices, a tilt angle of the virtual camera until the tilt angle equals one of a maximum tilt angle or a minimum tilt angle based at least in part on the data describing the drag performed by the user. The computer-implemented method includes, in response to the drag, panning, by the one or more computing devices, the virtual camera with respect to a rendering of a three-dimensional model included in the three-dimensional environment based at least in part on the data describing the drag performed by the user. The tilt angle is defined with respect to the rendering of the three-dimensional model.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A detailed discussion of embodiments of the present disclosure directed to one of ordinary skill in the art is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of embodiments, not limitation of the present disclosure. In fact, it will be apparent to those skilled in the art that various modifications and variations can be made to embodiments without departing from the scope or spirit of the present disclosure. For instance, features illustrated or described as part of one embodiment can be used with another embodiment to yield a still further embodiment.

Generally, the present disclosure is directed to systems and methods for controlling both tilt and pan of a viewpoint in a three-dimensional environment with a single gesture or interaction. In particular, when the user performs a drag gesture with respect to a rendering of a three-dimensional model included in the three-dimensional environment, a virtual camera representative of the viewpoint can first be tilted (e.g., change position and orientation by rotating about a pivot point) to provide a depiction of the rendering of the three-dimensional model from a different tilt angle. Once the tilt angle of the virtual camera reaches a maximum or minimum tilt angle, the remainder of the user's drag gesture can be translated into a pan interaction between the virtual camera and the rendering of the three-dimensional model. Thus, three-dimensional tilt and pan navigation can be provided in response to a single gesture.

The systems and methods of the present disclosure can be implemented to assist in navigating about a three-dimensional environment. The three-dimensional environment can include a rendering of a three-dimensional model. As an example, the three-dimensional environment can be provided by a geographic information system, mapping application, virtual globe application, or web-browser and the three-dimensional model can model some or all of the surface of the Earth, including terrain, structures such as roads and buildings, or other points of interest.

A user can navigate about the three-dimensional environment to view the rendering of the three-dimensional model from different perspectives or viewpoints. In particular, a virtual camera can be implemented to determine or be representative of a viewpoint provided to the user. The virtual camera can have a position and an orientation in three-dimensional space. The viewpoint of the virtual camera can have two local axes—an up axis and a right axis—and a line of sight extending in a direction normal to a view-plane defined by the up and right axes.

According to an aspect of the present disclosure, the virtual camera can also have a tilt angle. The tilt angle can refer to a deviation from a purely overhead view of the rendering of the three-dimensional model. In particular, the tilt angle can include one or more components of an angle between the line of sight of the virtual camera and a surface normal that is normal to a surface of the rendering of the three-dimensional model.

In some embodiments, the virtual camera can be controlled to tilt about only a single axis of the rendering of the three-dimensional model. Thus, the tilt angle can only include a single component or parameter, such as, for example, a x-axis tilt component. In other embodiments, the virtual camera can be controlled to tilt about both of the surface-plane axes of the rendering of the three-dimensional model. Thus, for example, the tilt angle of the virtual camera can include a y-axis tilt component in addition to the x-axis tilt component. As yet another example, the tilt angle can be a zenith angle.

A drag gesture can be received as input from a user. For example, a user accessing the mapping system via a web-browser can use a mouse or other user input device to click on and hold the rendering of the three-dimensional model and drag for some sustained period of time or physical length. As another example, a user accessing the mapping system via a computing device featuring a touch-sensitive screen can use a finger or other suitable object to press, hold, and drag the rendering of the three-dimensional model. Other gestures can be interpreted as a drag gesture for the purposes of the present disclosure, including, for example, a flick performed on a touch-sensitive screen or a hand gesture or other bodily movement captured by a motion-sensing device.

According to another aspect of the present disclosure, as a first response to the user-inputted drag gesture, the tilt angle of the virtual camera can be adjusted until the tilt angle equals one of a maximum tilt angle or a minimum tilt angle. For example, when the drag gesture is an upwards drag, the tilt angle can be adjusted to equal a maximum tilt value. As examples, the maximum tilt value can be 30 degrees or 45 degrees. In other words, the tilt angle of the virtual camera can be increased so that virtual camera is located closer to objects that were depicted in the lower portion of the screen, while objects that were in the upper portion of the screen are now farther away. Likewise, when the drag gesture is a downwards drag, the tilt angle can be adjusted to equal a minimum tilt value. As examples, the minimum tilt value can be zero degrees or negative 30 degrees.

As an example, adjusting the tilt angle of the virtual camera can be performed by pivoting the virtual camera about a pivot point. The pivot point can be located a given distance below a surface of the rendering of the three-dimensional model. For example, the pivot point can be located along the line of sight of the virtual camera. As another example, the pivot point can be located below a point on the surface of the rendering of the three-dimensional model that was selected by the user. Such user-selected point can be the point on the rendering that was initially pressed or clicked when the drag gesture was performed. As yet another example, the pivot point can be located a given distance below the point on the surface of the rendering of the three-dimensional model at which the line of sight intersects with the rendering.

The distance below the surface at which the pivot point is located can be adjusted based on an altitude or elevation of the virtual camera. For example, the distance can be proportional to the altitude of the virtual camera. As another example, the distance can be proportional to a total area of the rendering of the three-dimensional model that is depicted by (e.g., observable from) the viewpoint of the virtual camera. Furthermore, the maximum and minimum tilt angle values can also be a function of the altitude of the virtual camera or the total area of the rendering of the three-dimensional model depicted by the virtual camera.

Once the tilt angle reaches the maximum or minimum tilt angle value, the remainder of the received drag gesture can be transformed into a pan interaction between the virtual camera and the rendering of the three-dimensional model. Panning can include adjusting the location of the virtual camera without adjusting the tilt or altitude of the virtual camera. In particular, the virtual camera can be panned parallel to the surface of the rendering of the three-dimensional model in a direction that is opposite to the direction of drag gesture. For example, the direction of panning can be opposite to the direction of a projection of the drag gesture onto a surface-plane of the rendering.

Furthermore, according to another aspect of the present disclosure, the rate or speed at which the virtual camera is tilted and panned in response to the drag gesture can be proportional to a velocity associated with the drag gesture. Thus, a slow drag gesture can provide more control while a fast drag gesture will result in the virtual camera being quickly tilted and panned.

In such fashion, tilt and pan of a viewpoint in a three-dimensional environment can be controlled using a single gesture or interaction. Thus, the number of unique controls or widgets required for navigation in the three-dimensional environment can be reduced. Therefore, novice or first-time users will be able to quickly master control of navigating the viewpoint with only minimal effort to learn the single, intuitive control gesture.

Figure 1:
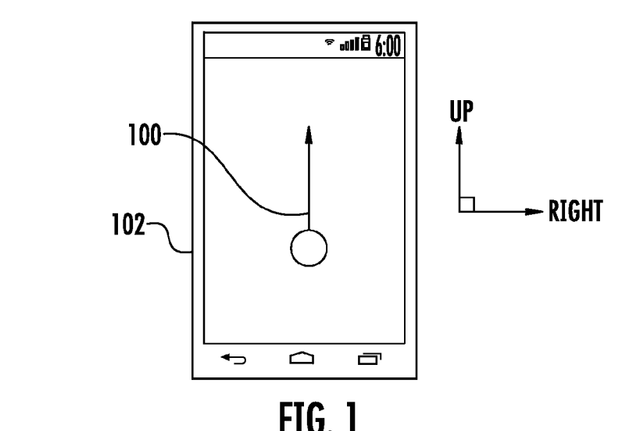
FIG. 1 depicts an exemplary drag gesture on an exemplary client device according to an exemplary embodiment of the present disclosure.

With reference now to the to the FIGS., exemplary embodiments of the present disclosure will be discussed in detail. FIG. 1 depicts an exemplary drag gesture 100 on an exemplary client device 102 according to an exemplary embodiment of the present disclosure. Client device 102 can be any suitable computing device, including a smartphone, as depicted in FIG. 1. Client device 102 can display a depiction of a rendering of a three-dimensional model as seen from a particular viewpoint.

Client device 102 and the depicted viewpoint can have an up-axis and a right-axis, as shown in FIG. 1. While the up-axis and right-axis are depicted in FIG. 1 as generally corresponding to a "top" and "right" physical portion of client device 102, it will be appreciated that the up-axis and right-axis are defined with respect to the viewpoint provided to the user of client device 102. Thus, rotation of client device 102 can result different physical areas of client device generally corresponding to the up-axis and the right-axis.

Drag gesture 100 includes a dragging motion in the positive up-axis direction. Drag gesture 100 can have been performed according to any suitable input method or device. As an example, the user can press, hold, and drag her finger upwards across a touch-sensitive screen of client device 102 to perform drag gesture 100. As another example, the user can use a stylus to press, hold, and drag, or can use a mouse or other user input device to click, hold, and drag.

Figure 2:
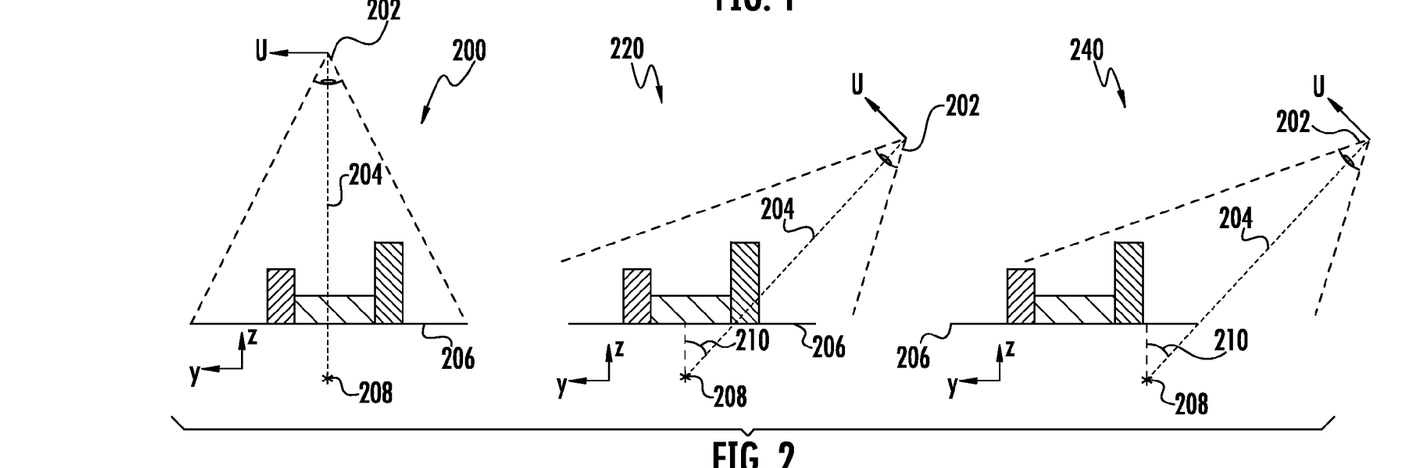
FIG. 2 depicts exemplary diagrams of tilt and pan navigation according to an exemplary embodiment of the present disclosure.

FIG. 2 depicts exemplary diagrams 200, 220, and 240 of tilt and pan navigation according to an exemplary embodiment of the present disclosure. In particular, the tilt and pan navigation depicted by diagrams 200, 220, and 240 show an exemplary response to drag gesture 100 of FIG. 1.

Depicted in diagrams 200, 220, and 240 is a virtual camera 202. Virtual camera 202 is representative of a viewpoint of a rendering of a three-dimensional model. Virtual camera 202 can have a line of sight 204. Line of sight 204 can be normal to a view-plane defined by an up-axis and a right-axis of virtual camera 202.

As depicted in diagram 200, the viewpoint provided by virtual camera 202 can initially be directly overhead of the rendering of the three-dimensional model. In other words, in diagram 200, the line of sight 204 is normal to a surface 206 of the rendering of the three dimensional model. Therefore, in diagram 200, a tilt angle 210 of virtual camera 202 has a magnitude of zero.

According to an aspect of the present disclosure, in response to a user drag gesture that includes an upwards component, such as drag gesture 100 of FIG. 1, tilt angle 210 of virtual camera 202 can be adjusted to equal a maximum tilt angle. In particular, as shown in diagram 220, virtual camera 202 can be pivoted about a pivot point 208 to adjust tilt angle 210 to a maximum tilt angle. Although tilt angle 210 is shown as about positive 45 degrees in diagram 220, a maximum tilt angle can be any suitable number of degrees, including, for example, 90 degrees.

According to another aspect of the present disclosure, in response to the same upwards drag gesture, such as drag gesture 100 of FIG. 1, virtual camera 202 can also be panned with respect to the rendering of the three-dimensional model. In particular, as shown in diagram 240, the position of virtual camera 202 in three-dimensional space can be adjusted in a direction parallel to surface 206 of the rendering while holding tilt angle 210 constant. For example, the direction of panning can be opposite to the direction of a projection of drag gesture 100 onto surface 206.

In some embodiments of the present disclosure, such as the embodiment depicted in FIG. 2, the tilt and pan of virtual camera 202 are performed sequentially, such that virtual camera 202 is first pivoted about pivot point 208 until tilt angle 210 reaches a maximum tilt angle value, and then the remainder of the drag gesture is subsequently translated into panning the location of virtual camera 202. However, in other embodiments, the tilt and pan of the virtual camera are performed simultaneously.

Furthermore, although pivot point 208 is located along line of sight 204 in FIG. 2, in other embodiments of the present disclosure pivot point 208 can be located below a point on the surface of the rendering of the three-dimensional model that was selected by the user. Such user-selected point can be the point on the rendering that was initially pressed or clicked when the drag gesture was performed. As yet another example, pivot point 208 can be located a given distance below the point on the surface of the rendering of the three-dimensional model at which line of sight 204 intersects with the rendering.

In addition, the distance below surface 206 at which pivot point 208 is located can be adjusted based on an altitude or elevation of virtual camera 202. For example, the distance can be proportional to the altitude of the virtual camera or a total area of the rendering of the three-dimensional model that is depicted by (e.g., observable from) the viewpoint of virtual camera 202. Further, the maximum and minimum tilt angle values can also be a function of the altitude of virtual camera 202 or the total area of the rendering of the three-dimensional model depicted by virtual camera 202.

Figure 3:
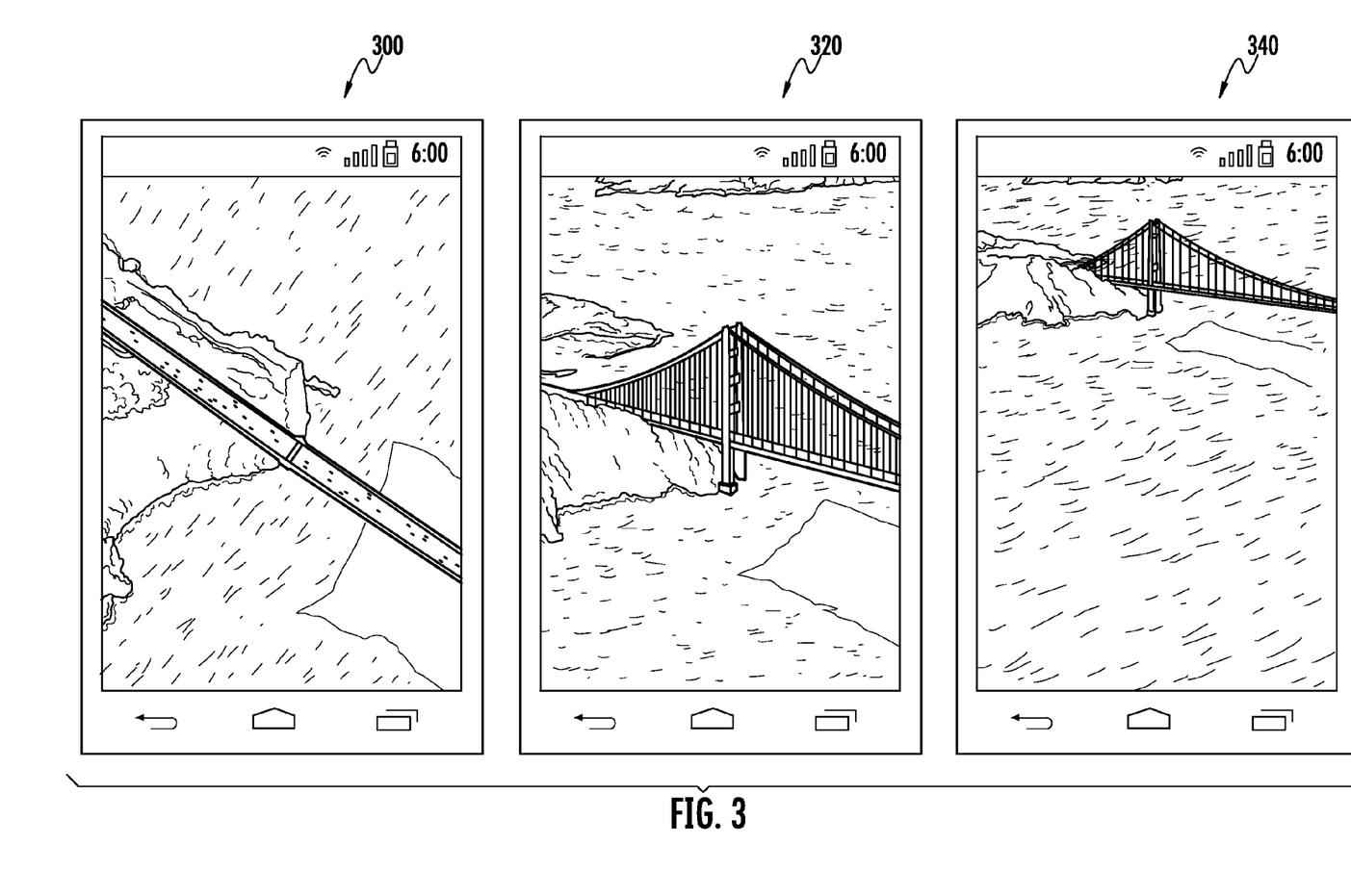
FIG. 3 depicts tilt and pan navigation on an exemplary client device according an exemplary embodiment of the present disclosure.

FIG. 3 depicts tilt and pan navigation on an exemplary client device according an exemplary embodiment of the present disclosure. In particular, the tilt and pan navigation depicted by diagrams 300, 320, and 340 of FIG. 3 shows an exemplary response to drag gesture 100 of FIG. 1. As shown in diagram 300, an initial position and orientation of a viewpoint can provide a purely overhead view of a rendering of the surface of the Earth.

According to an aspect of the present disclosure, in response to a drag gesture that contains an upwards component, such as drag gesture 100 of FIG. 1, a tilt angle of the viewpoint can first be adjusted to a maximum tilt angle, as shown in diagram 320. In other words, the tilt angle of the viewpoint can be increased so that viewpoint is located closer to objects that were previously depicted in the lower portion of the screen, while objects that were in the upper portion of the screen are now farther away.

According to another aspect of the present disclosure, in response to the same drag gesture, the viewpoint can be panned with respect to the rendering. In other words, as shown in diagram 340, the position of the viewpoint can be adjusted in a direction parallel to the surface of the rendering. In the case of a drag gesture that contains an upwards component, objects that were previously depicted as close to the viewpoint will now be depicted as farther away.

Figure 4:
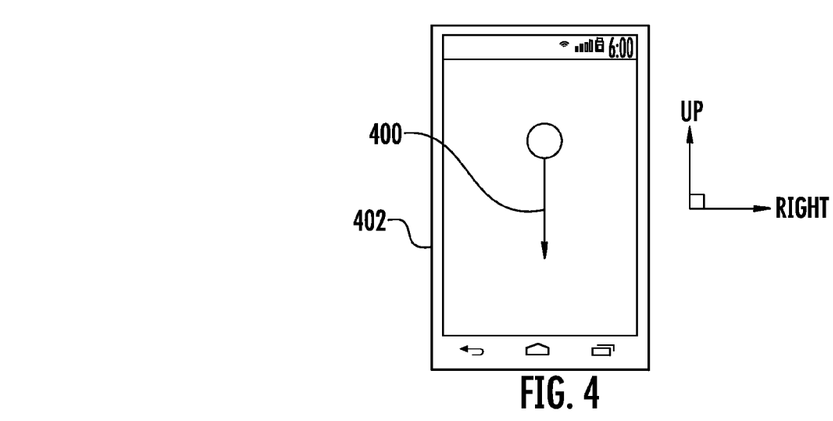
FIG. 4 depicts an exemplary drag gesture on an exemplary client device according to an exemplary embodiment of the present disclosure.

FIG. 4 depicts an exemplary drag gesture 400 on an exemplary client device 402 according to an exemplary embodiment of the present disclosure. Client device 402 can display a depiction of a rendering of a three-dimensional model as seen from a particular viewpoint. Client device 402 and the depicted viewpoint can have an up-axis and a right-axis, as shown in FIG. 4.

Drag gesture 400 includes a dragging motion in the negative up-axis direction. Thus, drag gesture 400 can be said to include a downwards component. Drag gesture 400 can have been performed according to any suitable input method or device. As an example, the user can press, hold, and drag her finger upwards across a touch-sensitive screen of client device 402 to perform drag gesture 400. As another example, the user can use a stylus to press, hold, and drag, or can use a mouse or other user input device to click, hold, and drag.

Figure 5:
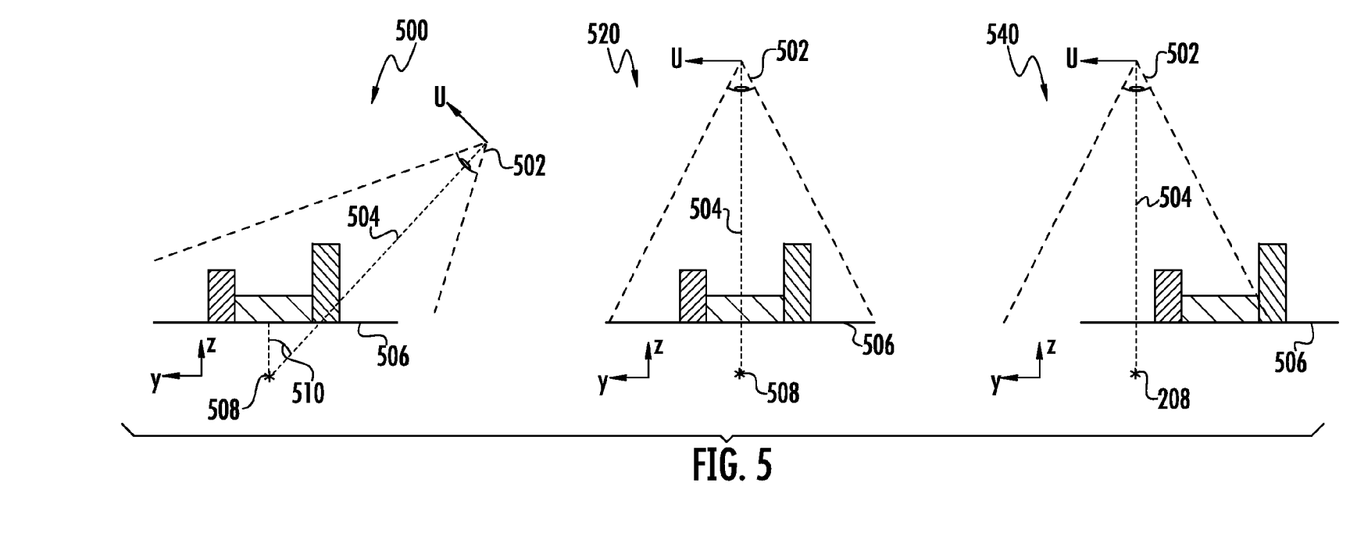
FIG. 5 depicts exemplary diagrams of tilt and pan navigation according to an exemplary embodiment of the present disclosure.

FIG. 5 depicts exemplary diagrams 500, 520, and 540 of tilt and pan navigation according to an exemplary embodiment of the present disclosure. In particular, the tilt and pan navigation depicted by diagrams 500, 520, and 540 shows an exemplary response to drag gesture 400 of FIG. 4.

Depicted in diagrams 500, 520, and 540 is a virtual camera 502. Virtual camera 502 is representative of a viewpoint of a rendering of a three-dimensional model. Virtual camera 502 can have a line of sight 504. Line of sight 504 can be normal to a view-plane defined by an up-axis and a right-axis of virtual camera 502.

As depicted in diagram 500, the viewpoint provided by virtual camera 502 can initially have a non-zero tilt angle 510. For example, in diagram 500, tilt angle 510 can equal a maximum tilt angle.

According to an aspect of the present disclosure, in response to a user drag gesture that includes a downwards component, such as drag gesture 400 of FIG. 4, tilt angle 510 of virtual camera 502 can be adjusted to equal a minimum tilt angle. In particular, as shown in diagram 520, virtual camera 502 can be pivoted about a pivot point 508 to adjust tilt angle 510 to a minimum tilt angle. Although tilt angle 510 is shown as about zero degrees in diagram 520, a minimum tilt angle can be any suitable number of degrees, including, for example, negative numbers.

According to another aspect of the present disclosure, in response to the same upwards drag gesture, such as drag gesture 400 of FIG. 4, virtual camera 502 can also be panned with respect to the rendering of the three-dimensional model. In particular, as shown in diagram 540, the position of virtual camera 502 in three-dimensional space can be adjusted in a direction parallel to surface 506 of the rendering while holding tilt angle 510 constant.

In some embodiments of the present disclosure, such as the embodiment depicted in FIG. 5, the tilt and pan of virtual camera 502 are performed sequentially, such that virtual camera 502 is first pivoted about pivot point 508 until tilt angle 510 reaches a minimum tilt angle value, and then the remainder of the drag gesture is subsequently translated into panning the location of virtual camera 502. However, in other embodiments, the tilt and pan of the virtual camera are performed simultaneously.

Furthermore, although pivot point 508 is located along line of sight 504 in FIG. 5, in other embodiments of the present disclosure pivot point 508 can be located below a point on the surface of the rendering of the three-dimensional model that was selected by the user. Such user-selected point can be the point on the rendering that was initially pressed or clicked when the drag gesture was performed. As yet another example, pivot point 508 can be located a given distance below the point on the surface of the rendering of the three-dimensional model at which line of sight 504 intersects with the rendering.

In addition, the distance below surface 506 at which pivot point 508 is located can be adjusted based on an altitude or elevation of virtual camera 502. For example, the distance can be proportional to the altitude of the virtual camera or a total area of the rendering of the three-dimensional model that is depicted by (e.g., observable from) the viewpoint of virtual camera 502. Further, the maximum and minimum tilt angle values can also be a function of the altitude of virtual camera 502 or the total area of the rendering of the three-dimensional model depicted by virtual camera 502.

Figure 6:
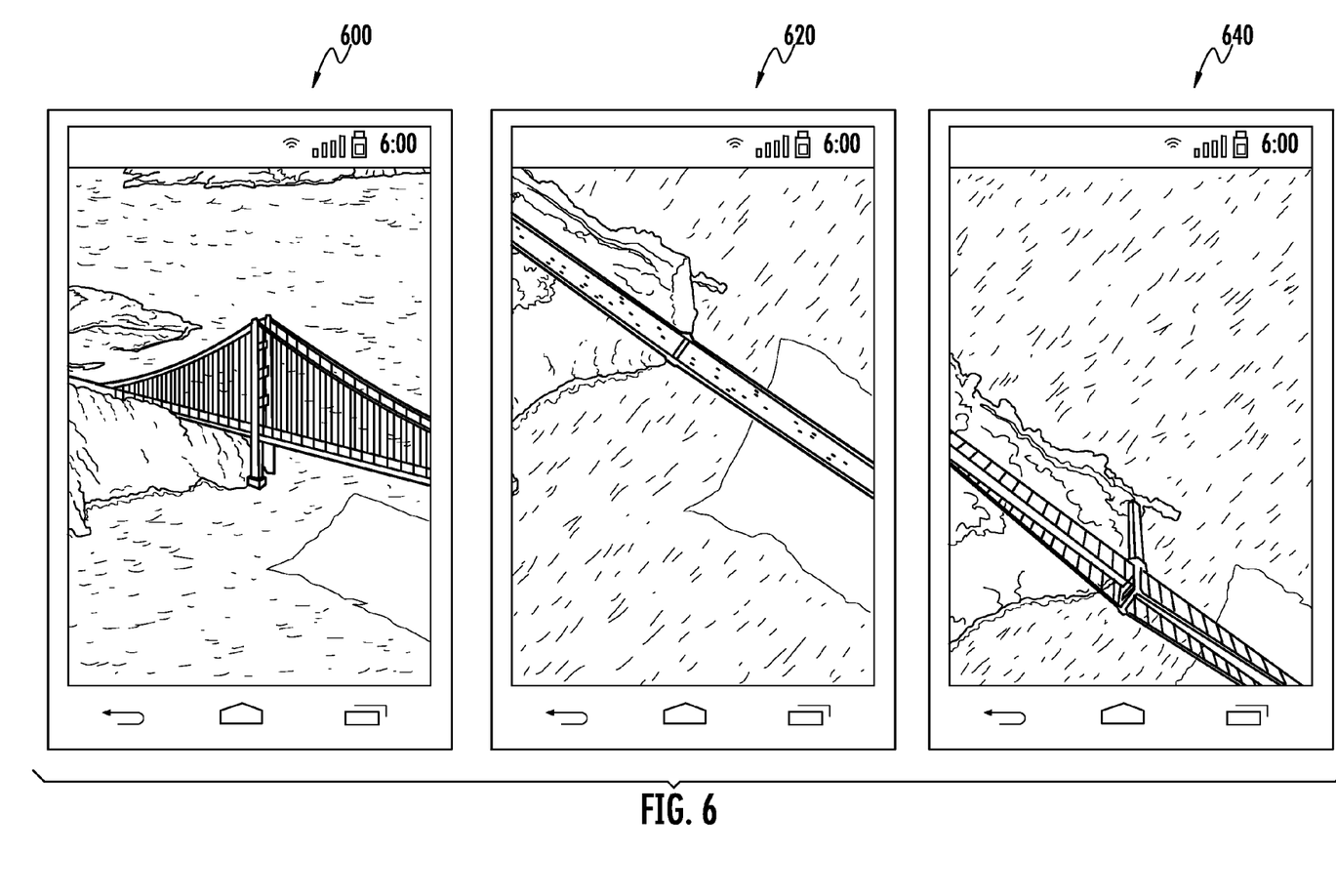
FIG. 6 depicts tilt and pan navigation on an exemplary client device according an exemplary embodiment of the present disclosure.

FIG. 6 depicts tilt and pan navigation on an exemplary client device according to an exemplary embodiment of the present disclosure. In particular, the tilt and pan navigation depicted by diagrams 600, 620, and 640 of FIG. 6 shows an exemplary response to drag gesture 400 of FIG. 4. As shown in diagram 600, an initial position and orientation of a viewpoint can have a non-zero tilt angle. For example, the tilt angle of the viewpoint shown in diagram 600 can equal a maximum tilt angle.

According to an aspect of the present disclosure, in response to a drag gesture that contains a downwards component, such as drag gesture 400 of FIG. 4, a tilt angle of the viewpoint can first be adjusted to a minimum tilt angle, as shown in diagram 620. In other words, the tilt angle of the viewpoint can be decreased so that viewpoint is located closer to objects that were previously depicted in the upper portion of the screen, while objects that were in the lower portion of the screen are now farther away.

According to another aspect of the present disclosure, in response to the same drag gesture, the viewpoint can be panned with respect to the rendering. In other words, as shown in diagram 640, the position of the viewpoint can be adjusted in a direction parallel to the surface of the rendering. In the case of a drag gesture that contains a downwards component, objects that were previously depicted in the upper portion of the screen will move towards the lower portion of the screen.

Figure 7:
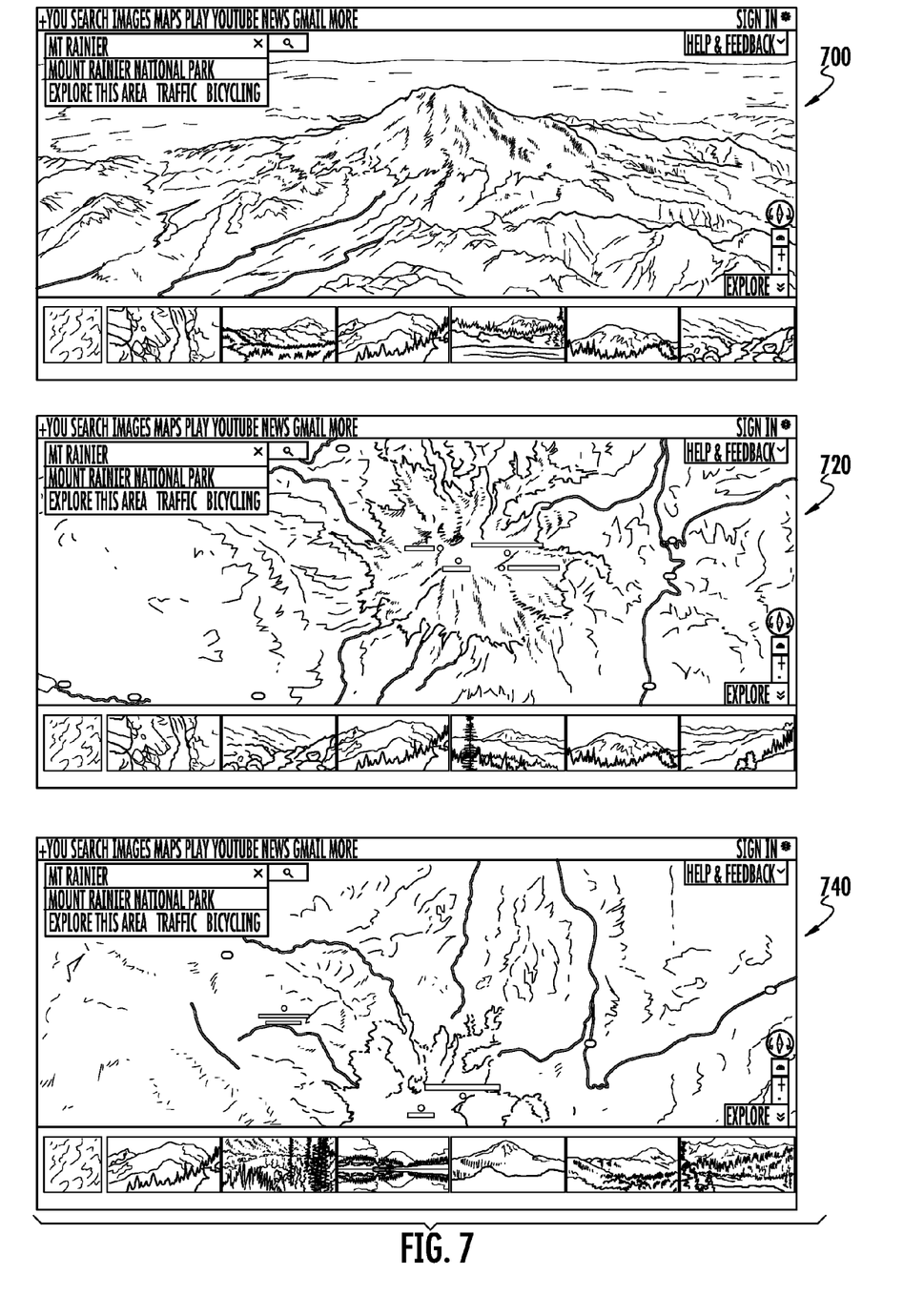
FIG. 7 depicts tilt and pan navigation in an exemplary user interface according to an exemplary embodiment of the present disclosure.

FIG. 7 depicts tilt and pan navigation in an exemplary user interface according an exemplary embodiment of the present disclosure. In particular, the tilt and pan navigation depicted by diagrams 700, 720, and 740 of FIG. 7 shows an exemplary response to drag gesture 400 of FIG. 4. As shown in diagram 700, an initial position and orientation of a viewpoint can have a non-zero tilt angle. For example, the tilt angle of the viewpoint shown in diagram 700 can equal a maximum tilt angle.

According to an aspect of the present disclosure, in response to a drag gesture that contains a downwards component, such as drag gesture 400 of FIG. 4, a tilt angle of the viewpoint can first be adjusted to a minimum tilt angle, as shown in diagram 720. In other words, the tilt angle of the viewpoint can be decreased so that viewpoint is located closer to objects that were previously depicted in the upper portion of the screen, while objects that were in the lower portion of the screen are now farther away.

According to another aspect of the present disclosure, in response to the same drag gesture, the viewpoint can be panned with respect to the rendering. In other words, as shown in diagram 740, the position of the viewpoint can be adjusted in a direction parallel to the surface of the rendering. In the case of a drag gesture that contains a downwards component, objects that were previously depicted in the upper portion of the screen will move towards the lower portion of the screen.

Figure 8:
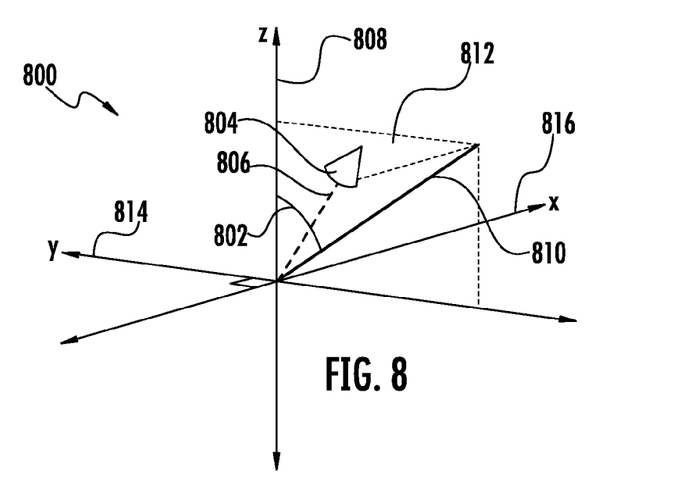
FIG. 8 depicts an exemplary diagram of an exemplary tilt angle according to an exemplary embodiment of the present disclosure.

FIG. 8 depicts an exemplary diagram 800 of an exemplary tilt angle according to an exemplary embodiment of the present disclosure. In particular, diagram 800 depicts an exemplary x-axis tilt angle 802 of a virtual camera 804. Virtual camera 804 has a line of sight 806.

According to an aspect of the present disclosure, x-axis tilt angle 802 can be defined as the angle between a surface-normal vector 808 and a projection 810 of line of sight 806 onto a y-axis plane 812. In particular, y-axis plane 812 can be the plane defined by surface-normal vector 808 and a y-axis 814.

In some implementations, as depicted in FIG. 8, the surface-plane axes of y-axis 814 and an x-axis 816 are defined relative to virtual camera 804. In particular, y-axis 814 can be defined by a projection of an up-axis associated with virtual camera 804 onto the surface-plane when virtual camera 804 has a tilt angle of zero (e.g., is providing a purely overhead view). Likewise, x-axis 816 can be defined by a projection of a right-axis associated with virtual camera 804 onto the surface-plane when virtual camera 804 has a tilt angle of zero (e.g., is providing a purely overhead view). Thus, in such implementations, y-axis 814 and x-axis 816 are not fixed according to global directional notions (e.g., North and East directions), but are instead defined relative to the viewpoint provided by virtual camera 804.

As shown in diagram 800, x-axis tilt angle 802 can have a positive magnitude. Such positive magnitude can result from a drag gesture that contained an upwards component (e.g., an up-axis component of positive magnitude).

Figure 9:
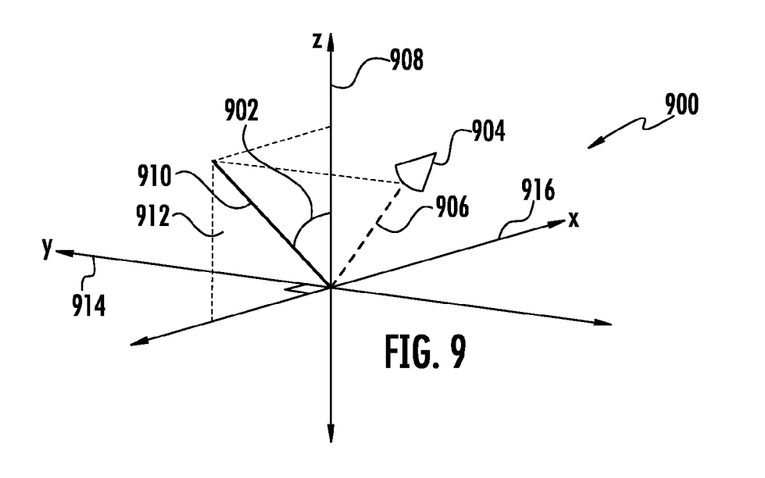
FIG. 9 depicts an exemplary diagram of an exemplary tilt angle according to an exemplary embodiment of the present disclosure.

FIG. 9 depicts an exemplary diagram 900 of an exemplary tilt angle according to an exemplary embodiment of the present disclosure. In particular, diagram 900 depicts an exemplary y-axis tilt angle 902 of a virtual camera 904. Virtual camera 904 has a line of sight 906.

According to an aspect of the present disclosure, y-axis tilt angle 902 can be defined as the angle between a surface-normal vector 908 and a projection 910 of line of sight 906 onto an x-axis plane 912. In particular, x-axis plane 912 can be the plane defined by surface-normal vector 808 and an x-axis 916.

In some implementations, as depicted in FIG. 9, the surface-plane axes of y-axis 914 and x-axis 916 are defined relative to virtual camera 904. In particular, y-axis 914 can be defined by a projection of an up-axis associated with virtual camera 904 onto the surface-plane when virtual camera 904 has a tilt angle of zero (e.g., is providing a purely overhead view). Likewise, x-axis 916 can be defined by a projection of a right-axis associated with virtual camera 904 onto the surface-plane when virtual camera 904 has a tilt angle of zero (e.g., is providing a purely overhead view). Thus, in such implementations, y-axis 914 and x-axis 916 are not fixed according to global directional notions (e.g., North and East directions), but are instead defined relative the viewpoint provided by virtual camera 904.

As shown in diagram 900, y-axis tilt angle 902 can have a positive magnitude. Such positive magnitude can result from a drag gesture that contained a rightwards component (e.g., a right-axis component of positive magnitude). Likewise, in response to a drag gesture that contains a leftwards component (e.g., a right-axis component of negative magnitude), y-axis tilt angle 902 can have a negative magnitude (e.g., tilt to the opposing side of surface-normal vector 908).

Furthermore, in embodiments of the present disclosure in which the tilt angle of the viewpoint or virtual camera includes both a y-axis component and an x-axis component, the maximum and minimum x-axis tilt angle values need not be equivalent to the maximum and minimum y-axis tilt angle values.

Figure 10:
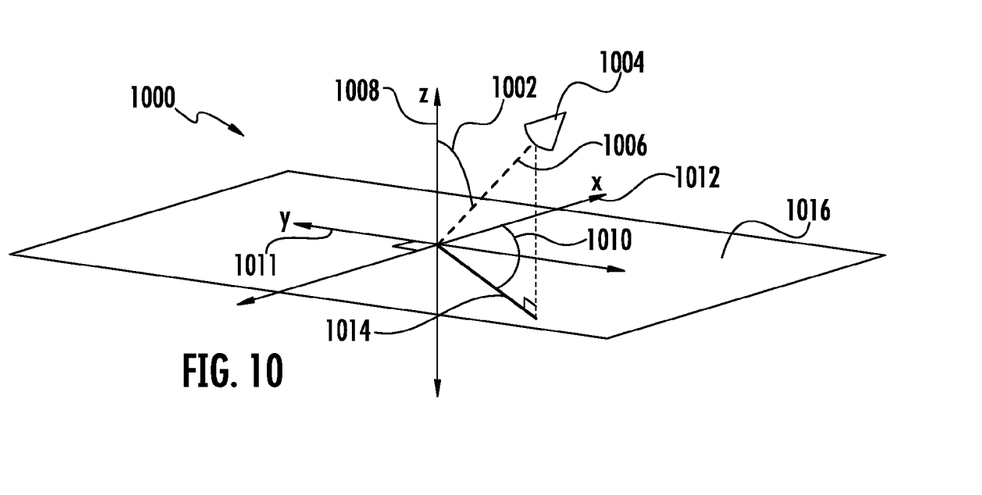
FIG. 10 depicts an exemplary diagram of an exemplary tilt angle according to an exemplary embodiment of the present disclosure.

FIG. 10 depicts an exemplary diagram 1000 of an exemplary tilt angle according to an alternative exemplary embodiment of the present disclosure in which the surface-plane axes are fixed according to global directional notions. In particular, diagram 1000 depicts an exemplary zenith angle 1002 of a virtual camera 1004. Virtual camera 1004 has a line of sight 1006.

According to an aspect of the present disclosure, zenith angle 1002 can be defined as the angle between a surface-normal vector 1008 and line of sight 1006.

According to another aspect of the present disclosure, in the alternative embodiment depicted in FIG. 10, virtual camera 1004 can further have an azimuthal angle 1010. Azimuthal angle 1010 can be defined as the angle between an x-axis 1012 and a projection 1014 on line of sight 1006 onto a surface-plane 1016. The maximum and minimum values of zenith angle 1002 can be a function of the azimuthal angle 1010.

As noted above, FIG. 10 depicts an alternative exemplary embodiment in which y-axis 1011 and x-axis 1012 of surface-plane 1016 are globally fixed. Thus, azimuthal angle 1010 can indicate a degree of rotation of virtual camera 1004 about the surface-normal vector 1008.

One of skill in the art will appreciate, in light of the disclosures provided herein, that the various conventions used to define the axes and angles described in FIGS. 8-10, such as, for example, names, directions of positivity or negativity, relative defining points or axes, or other conventions or attributes, can be adjusted or redefined to provide yet further embodiments in accordance with the present disclosure.

Figure 11:
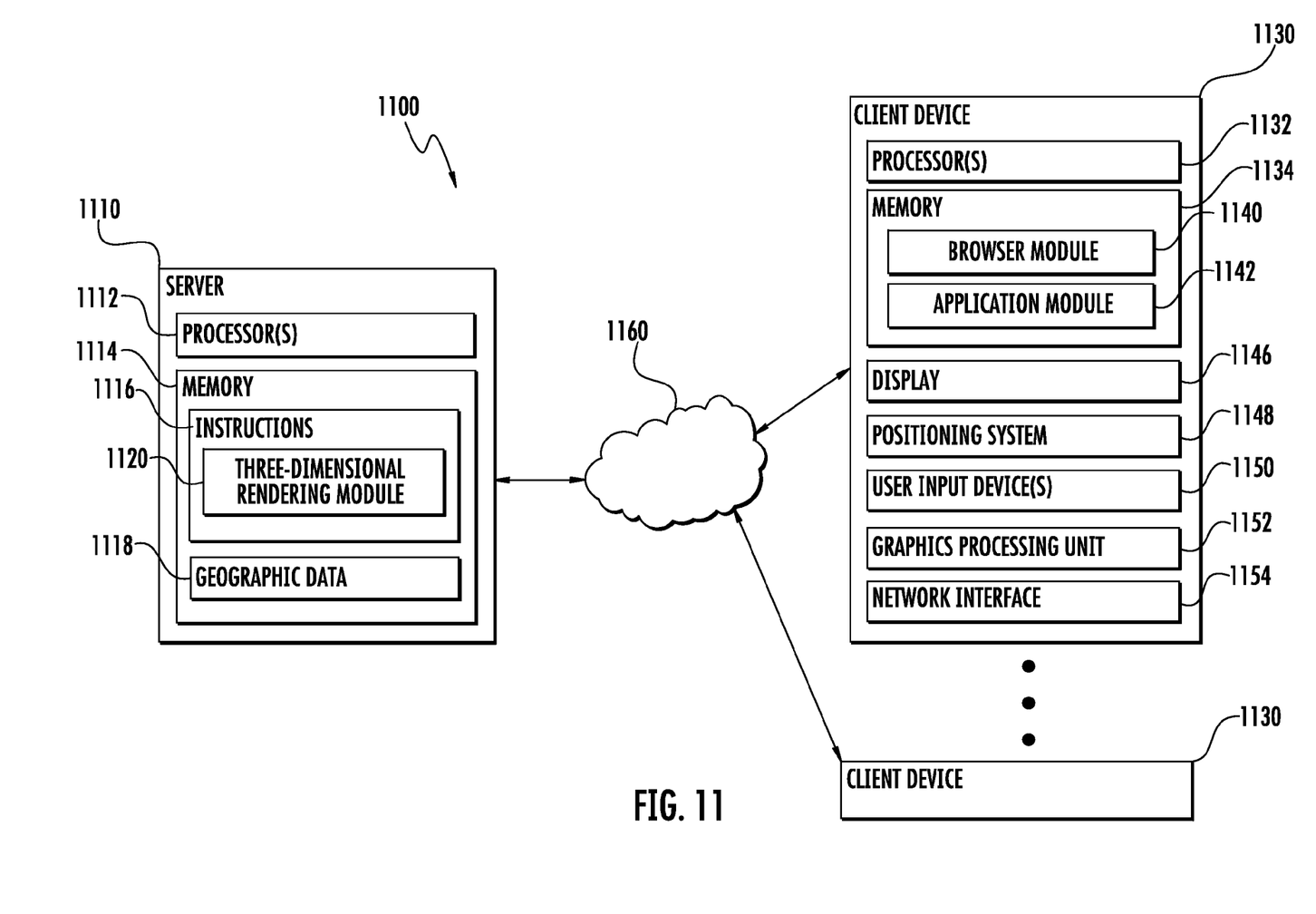
FIG. 11 depicts an exemplary computing system according to an exemplary embodiment of the present disclosure.

FIG. 11 depicts an exemplary computing system 1100 that can be used to implement tilt and pan navigation in a three-dimensional environment according to aspects of the present disclosure. The system 1100 has a client-server architecture that includes a server 1110 that communicates with one or more client devices 1130 over a network 1160. However, the present disclosure can be implemented using other suitable architectures, such as a single computing device unconnected to a network.

The system 1100 includes a server 1110, such as, for example, a web server. The server 1110 can be one or more computing devices that are implemented as a parallel or distributed computing system. In particular, multiple computing devices can act together as a single server 1110. The server 1110 can have one or more processor(s) 1112 and a memory 1114. The server 1110 can also include a network interface used to communicate with one or more remote computing devices (e.g., client devices) 1130 over a network 1160.

The processor(s) 1112 can be any suitable processing device, such as a microprocessor, microcontroller, integrated circuit, or other suitable processing device. The memory 1114 can include any suitable computing system or media, including, but not limited to, non-transitory computer-readable media, RAM, ROM, hard drives, flash drives, or other memory devices. The memory 1114 can store information accessible by processor(s) 1112, including instructions 1116 that can be executed by processor(s) 1112. The instructions 1116 can be any set of instructions that when executed by the processor(s) 1112, cause the processor(s) 1112 to provide desired functionality.

In particular, the instructions 1116 can be executed by the processor(s) 1112 to implement a three-dimensional rendering module 1120. The three-dimensional rendering module 1120 can be configured to render a three-dimensional model in a three-dimensional environment according to any known rendering techniques or technology.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 1114 can also include geographic data 1118 that can be retrieved, manipulated, created, or stored by processor(s) 1112. Geographic data 1118 can include geographic imagery (e.g., digital maps, satellite images, aerial photographs, street-level photographs, synthetic models, etc.), tables, vector data (e.g., vector representations of roads, parcels, buildings, etc.), point of interest data (e.g., locales such as islands, cities, restaurants, hospitals, parks, hotels, and schools), or other suitable geospatial data or related information. As an example, geographic data 1118 can be used to generate a rendering of a three-dimensional model of the surface of the Earth.

The geographic data 1118 can be stored in one or more databases. The one or more databases can be connected to the server 1110 by a high bandwidth LAN or WAN, or can also be connected to server 1110 through network 1160. The one or more databases can be split up so that they are located in multiple locales.

The server 1110 can exchange data with one or more client devices 1130 over the network 1160. Although two clients 1130 are illustrated in FIG. 10, any number of client devices 1130 can be connected to the server 1110 over the network 1160. The client devices 1130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, client device 1130 can be multiple computing devices acting together to perform operations or computing actions.

Similar to server 1110, a client device 1130 can include a processor(s) 1132 and a memory 1134. The memory 1134 can store information accessible by processor(s) 1132, including instructions that can be executed by processor(s) and data. As an example, memory 1134 can store a browser module 1140 and an application module 1142.

Browser module 1140 can provide instructions for implementing a browser. In particular, the user of client device 1130 can exchange data with server 1110 by using the browser to visit a website accessible at a particular web-address. The tilt and pan navigation of the present disclosure can be provided as an element of a user interface of the website.

Application module 1142 can provide instructions for running a specialized application on client device 1130. In particular, the specialized application can be used to exchange data with server 1110 over the network 1160. Application module 1142 can include client-device-readable code for providing and implementing aspects of the present disclosure. For example, application module 1142 can provide instructions for implementing a mapping application or a virtual globe application.

The client device 1130 can include various user input devices 1150 for receiving information from a user, such as a touch screen, touch pad, data entry keys, speakers, mouse, motion sensor, and/or a microphone suitable for voice recognition. Further, the client device 1130 can have a display 1146 for presenting information, such as a rendering of a three-dimensional model in a three-dimensional environment.

The client device 1130 can also include a positioning system 1148 that can be used to identify the position of the client device 1130. The positioning system 1148 can be optionally used by the user to monitor the user's position relative to the rendering. The positioning system 1148 can be any device or circuitry for monitoring the position of the client device 1130. For example, the positioning device 1148 can determine actual or relative position by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 1130 can further include a graphics processing unit 1152. Graphics processing unit 1152 can be used by processor 1132 to render or depict three-dimensional imagery. In some embodiments, client device 1130 performs any and all three-dimensional rendering required for providing the three-dimensional environment.

The client device 1130 can include a network interface 1154 for communicating with server 1110 over network 1160. Network interface 1154 can include any components or configuration suitable for communication with server 1110 over network 1160, including, for example, one or more ports, transmitters, wireless cards, controllers, physical layer components, or other items for communication according to any currently known or future developed communications protocol or technology.

The network 1160 can be any type of communications network, such as a local area network (e.g., intranet), wide area network (e.g., Internet), or some combination thereof. The network 1160 can also include a direct connection between a client device 1130 and the server 1110. In general, communication between the server 1110 and a client device 1130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling a virtual camera in a three-dimensional environment, the computer-implemented method comprising:

receiving, by one or more computing devices, data describing a drag gesture performed by a user, wherein the drag gesture comprises a single user input that selects and then holds and drags a portion of the three-dimensional environment in a linear direction; and in response to the drag gesture:

when the drag gesture comprises an upwards drag, incrementally adjusting, by the one or more computing devices, a tilt angle of the viewpoint until the tilt angle equals a maximum tilt value;

when the drag gesture comprises a downwards drag, incrementally adjusting, by the one or more computing devices, the tilt angle of the viewpoint until the tilt angle equals a minimum tilt value;

after the tilt angle of the virtual camera has been incrementally adjusted until the tilt angle equals one of the maximum tilt angle or the minimum tilt angle, panning, by the one or more computing devices, the virtual camera with respect to a rendering of a three-dimensional model included in the three-dimensional environment based at least in part on the data describing the drag gesture performed by the user, such that the virtual camera is sequentially tilted and then panned in response to the drag gesture;

wherein incrementally adjusting the tilt angle comprises pivoting the viewpoint of the three-dimensional rendering about a pivot point located beneath a surface of the three-dimensional rendering;

wherein panning the viewpoint with respect to the three-dimensional rendering comprises adjusting the location of the viewpoint in a direction parallel to the surface of the three-dimensional rendering while holding the tilt angle constant; and wherein the tilt angle is defined with respect to the rendering of the three-dimensional model.

2. The computer-implemented method of claim 1, wherein a first distance at which the pivot point is located below the surface of the rendering of the three-dimensional model is based at least in part on a second distance at which the virtual camera is located above the surface of the rendering of the three-dimensional model.

3. The computer-implemented method of claim 1, wherein the pivot point is located along a line of sight associated with the virtual camera.

4. The computer-implemented method of claim 1, wherein the pivot point is located below a selected point on the surface of the rendering of the three-dimensional model, and wherein the selected point is the point at which the drag was initiated.

5. The computer-implemented method of claim 1, wherein the maximum tilt angle is based at least in part on an altitude of the virtual camera above the rendering of the three-dimensional model.

6. The computer-implemented method of claim 1, further comprising continuously providing, by the one or more computing devices, a depiction of the rendering of the three-dimensional model from a perspective of the virtual camera.

7. The computer-implemented method of claim 1, wherein:
the three-dimensional model comprises a three-dimensional model of the surface of the Earth; and
the tilt angle of the virtual camera is measured with respect to a normal vector that is normal to the surface of the Earth.

8. The computer-implemented method of claim 1, wherein:
the drag is performed in a first direction; and
panning the virtual camera with respect to the rendering of the three-dimensional model comprises panning the virtual camera in a second direction with respect to the rendering of the three-dimensional model, wherein the second direction is opposite to the first direction.

9. The computer-implemented method of claim 1, wherein the tilt angle comprises an x-axis tilt angle, wherein the x-axis tilt angle is defined as the angle between a normal vector normal to a surface of the rendering of the three-dimensional model and a projection of a line of sight associated with the virtual camera onto a y-axis plane.

10. The computer-implemented method of claim 1, wherein the minimum tilt angle comprises one of zero degrees or a negative value.

11. The computer-implemented method of claim 1, wherein incrementally adjusting the tilt angle of the virtual camera comprises incrementally increasing or decreasing the tilt angle at a rate that is proportional to a velocity of the drag.

12. A non-transitory computer-readable medium storing instructions that, when executed by one or more computing devices, cause the one or more computing devices to perform operations, the operations comprising:

receiving, by the one or more computing devices, data describing a drag gesture performed by a user, wherein the drag gesture comprises a single user input that selects and then holds and drags a rendering of a three-dimensional model in a linear direction;

when the drag gesture comprises an upwards drag, adjusting, by the one or more computing devices in response to the drag gesture, a tilt angle of a viewpoint of the rendering of the three-dimensional model included in a three-dimensional environment to equal a maximum tilt value;

when the drag gesture comprises a downwards drag, adjusting, by the one or more computing devices in response to the drag gesture, the tilt angle of the viewpoint to equal a minimum tilt value; and after adjusting the tilt angle of the viewpoint to equal the maximum tilt value or the minimum tilt value, panning, by the one or more computing devices in response to the drag gesture, the viewpoint with respect to the rendering of the three-dimensional model, such that the virtual camera is sequentially tilted and then panned in response to the drag gesture;

wherein adjusting the tilt angle comprises pivoting the viewpoint of the three-dimensional rendering about a pivot point located beneath a surface of the three-dimensional rendering; and wherein panning the viewpoint with respect to the three-dimensional rendering comprises adjusting the location of the viewpoint in a direction parallel to the surface of the three-dimensional rendering while holding the tilt angle constant.

13. A computing device comprising a processor and a memory, the memory storing instructions that, when executed by the processor, cause the computing device to perform operations, the operations comprising:

receiving, by the computing device, data describing a drag gesture performed by a user, wherein the drag gesture has an up-axis component of a first magnitude and a right-axis component of a second magnitude, and wherein the up-axis and the right-axis are defined with respect to a viewpoint of a three-dimensional rendering provided to the user;

when the first magnitude is greater than zero:
adjusting, by the computing device, an x-axis tilt angle of the viewpoint to equal a maximum x-axis tilt value; and
panning, by the computing device, the viewpoint negatively along a y-axis of the three-dimensional rendering; and when the first magnitude is less than zero:
adjusting, by the computing device, the x-axis tilt angle of the viewpoint to equal a minimum x-axis tilt value; and
panning, by the computing device, the viewpoint positively along the y-axis of the three-dimensional rendering;

when the second magnitude is greater than zero:
adjusting, by the computing device, a y-axis tilt angle of the viewpoint to equal a maximum y-axis tilt value; and panning, by the computing device, the viewpoint negatively along an x-axis of the three-dimensional rendering; and when the second magnitude is less than zero:
  adjusting, by the computing device, the y-axis tilt angle of the viewpoint to equal a minimum y-axis tilt value; and
  panning, by the computing device, the viewpoint positively along the x-axis of the three-dimensional rendering;
wherein the x-axis tilt angle and the y-axis tilt angle are adjusted in a simultaneous fashion; and
wherein the computing device continuously provides a depiction of the three-dimensional rendering while the x-axis tilt angle and the y-axis tilt angle are simultaneously adjusted.

14. The computing device of claim 13, wherein the x-axis tilt angle comprises the angle between a normal vector and a projection of a line of sight of the viewpoint onto a plane defined by the y-axis and the normal vector, and wherein the normal vector is normal to a surface of the three-dimensional rendering.

15. The computer-implemented method of claim 1:
wherein the drag gesture has an up-axis component of a first magnitude and a right-axis component of a second magnitude, and wherein the up-axis and the right-axis are defined with respect to a viewpoint of the three-dimensional rendering provided to the user; and
wherein incrementally adjusting, by the one or more computing devices, the tilt angle of the virtual camera until the tilt angle equals one of the maximum tilt angle or the minimum tilt angle based at least in part on the data describing the drag gesture performed by the user comprises:
  adjusting, by the one or more computing devices based on the first magnitude of the up-axis component of the drag gesture, an x-axis tilt angle of the viewpoint until the x-axis tilt angle equals one of the maximum tilt angle or the minimum tilt angle; and
  maintaining, by the one or more computing devices, a y-axis tilt angle of the viewpoint at zero regardless of the second magnitude of the right-axis component of the drag gesture.

* * * * *